US010338292B2

United States Patent
Chang et al.

(10) Patent No.: US 10,338,292 B2
(45) Date of Patent: Jul. 2, 2019

(54) LIGHT GUIDE PLATE, BACKLIGHT MODULE AND DISPLAY DEVICE

(71) Applicants: Radiant Opto-Electronics (Suzhou) Co.,Ltd., Jiangsu (CN); Radiant Opto-Electronics Corporation, Kaohsiung (TW)

(72) Inventors: Chia-Yin Chang, Kaohsiung (TW); Shin-Bo Lin, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/686,170

(22) Filed: Aug. 25, 2017

(65) Prior Publication Data

US 2018/0088267 A1    Mar. 29, 2018

Related U.S. Application Data

(63) Continuation of application No. PCT/CN2016/100770, filed on Sep. 29, 2016.

(51) Int. Cl.
    *F21V 8/00* (2006.01)
(52) U.S. Cl.
    CPC .......... *G02B 6/0016* (2013.01); *G02B 6/009* (2013.01); *G02B 6/0028* (2013.01); *G02B 6/0046* (2013.01); *G02B 6/0055* (2013.01)
(58) Field of Classification Search
    CPC .... G02B 6/0016; G02B 6/0018; G02B 6/002; G02B 6/0028
    See application file for complete search history.

(56) References Cited

U.S. PATENT DOCUMENTS

| 8,625,050 B2 | 1/2014 | Shinohara et al. |
| 2014/0211125 A1* | 7/2014 | Kurata .................. G02B 6/002 349/65 |
| 2015/0092440 A1 | 4/2015 | Kim et al. |

FOREIGN PATENT DOCUMENTS

| CN | 103257391 A | 8/2013 |
| CN | 103307512 A | 9/2013 |
| CN | 103901528 A | 7/2014 |
| CN | 203909333 U | 10/2014 |
| CN | 205246927 U | 5/2016 |
| CN | 205402403 U | 7/2016 |
| KR | 20130048351 A | 5/2013 |

(Continued)

*Primary Examiner* — Sean P Gramling
(74) *Attorney, Agent, or Firm* — CKC & Partners Co., LLC

(57) ABSTRACT

A light guide plate, a backlight module and a display device are provided. The light guide plate includes a main body, plural first strip structures and second strip structures. The main body includes a light incident surface, an end portion and a light guide portion. The end portion has at least one inclined surface. The light guide portion is connected to the end portion. The light guide portion has a first optical surface and a second optical surface. At least one portion of each of the first strip structures is disposed on the first optical surface. At least one portion of each of the second strip structures is disposed on the second optical surface. An inherent type, an arrangement manner or an arrangement position of the first strip structures is different from an inherent type, an arrangement manner or an arrangement position of the second strip structures.

29 Claims, 8 Drawing Sheets

(56) References Cited

FOREIGN PATENT DOCUMENTS

| TW | M350026 U | 2/2009 |
|---|---|---|
| TW | M445701 U | 1/2013 |
| TW | I457622 B | 10/2014 |
| TW | I485450 B | 5/2015 |

\* cited by examiner

LIGHT GUIDE PLATE, BACKLIGHT MODULE AND DISPLAY DEVICE

RELATED APPLICATIONS

This application is a continuation application of International Application No. PCT/CN2016/100770 filed on Sep. 29, 2016, which is incorporated herein by reference.

BACKGROUND

Field of Invention

The present invention relates to a light guide element and its application. More particularly, the present invention relates to a light guide plate and its applications in a backlight module and a display device.

Description of Related Art

In order to meet the design trend of thinness of the backlight module, light guide plates are designed to be thinner. However, when the thickness of the light guide plate is reduced, the light emitting diodes cannot be reduced to the same height as the thickness of the light guide plate. If the height of the light-emitting diode is greater than the thickness of the light guide plate, the light guide plate cannot effectively use the light generated from the light-emitting diode, thus leading to a light leakage problem in the light guide plate.

In order to solve the aforementioned problem, a light guide plate with special shape is used to replace the conventional flat-plate type light guide plate in the general backlight module. The light guide plate with special shape mainly includes a tapered portion and a flat plate portion connected to the tapered portion. A thickness of one end of the tapered portion near a light source is greater than a thickness of the other end of the tapered portion which is connected to the flat plate portion. Therefore, light generated from the light source can enter the light guide plate from the tapered portion with a greater thickness and can propagate towards the flat plate portion. Therefore, the tapered portion can effectively utilize light generated from the light source, and the thickness of the flat plate portion can be reduced accordingly.

However, although the light guide plate with special shape can solve the aforementioned problem, when light propagates in such light guide plate with special shape, a portion of light will leak from a connection portion between the tapered portion and the flat plate portion, thus seriously affecting the optical appearance of the light guide plate.

SUMMARY

An object of the invention is to provide a light guide plate, a backlight module and a display device, in which the light guide plate has strip structures which can be used to mix light leaked from a light-incident side of the light guide plate, so as to increase illumination uniformity of the backlight module and the display device.

According to the aforementioned object, a light guide plate is provided. The light guide plate includes a main body, plural first strip structures and plural second strip structures. The main body includes a light incident surface, an end portion and a light guide portion. The end portion has at least one inclined surface. The light guide portion is connected to the end portion, in which the light guide portion has a first optical surface and a second optical surface opposite to the first optical surface. At least one portion of each of the first strip structures is disposed on the first optical surface. At least one portion of each of the second strip structures is disposed on the second optical surface. An inherent type, an arrangement manner or an arrangement position of the first strip structures is different from an inherent type, an arrangement manner or an arrangement position of the second strip structures.

According to an embodiment of the present invention, an extending direction of each first strip structure and an extending direction of each second strip structure are vertical to the light incident surface.

According to an embodiment of the present invention, each of the second strip structures has a more significant feature than each of the first strip structures.

According to an embodiment of the present invention, a length of each second strip structure is greater than that of each first strip structure.

According to an embodiment of the present invention, each of the second strip structures and the first strip structures is a convex portion, and a height of each second strip structure is greater than a height of each first strip structure.

According to an embodiment of the present invention, each of the second strip structures and the first strip structures is a concave portion, and a depth of each second strip structure is greater than a depth of each first strip structure.

According to an embodiment of the present invention, an arrangement density of the second strip structures is greater than an arrangement density of the first strip structures.

According to an embodiment of the present invention, a thickness of one end near the light incident surface of the end portion is greater than the other end of the end portion.

According to an embodiment of the present invention, the end portion includes a first inclined surface and a second inclined surface. The first inclined surface is connected to the first optical surface, in which each of the first strip structures is connected to a first bottom edge of the first inclined surface. The second inclined surface is connected to the second optical surface, in which each of the second strip structures is connected to a second bottom edge of the second inclined surface.

According to an embodiment of the present invention, the end portion includes a first inclined surface and a second inclined surface. The first inclined surface is connected to the first optical surface. The second inclined surface is connected to the second optical surface, in which a first distance between each first strip structure and a first bottom edge of the first inclined surface is different from a second distance between each second strip structure and a second bottom edge of the second inclined surface.

According to an embodiment of the present invention, the end portion includes a first inclined surface and a second inclined surface. The first inclined surface is connected to the first optical surface, in which one portion of each first strip structure is located on the first inclined surface, and the other portion of each first strip structure is located on the first optical surface. The second inclined surface is connected to the second optical surface, in which one portion of each second strip structure is located on the second inclined surface, and the other portion of each second strip structure is located on the second optical surface.

According to an embodiment of the present invention, one end of each of the first strip structures and the second strip structures away from the light incident surface is located between the light incident surface of the main body and a side surface opposite to the light incident surface.

According to an embodiment of the present invention, the end portion includes a first inclined surface and a second inclined surface. The first inclined surface has a first top edge and a first bottom edge, in which the first bottom is connected to the first optical surface. The second inclined surface has a second top edge and a second bottom edge, in which the second bottom edge is connected to the second optical surface. The light incident surface is connected to the first top edge and the second top edge.

According to an embodiment of the present invention, the end portion includes a first platform surface, a second platform surface, a first inclined surface and a second inclined surface. The first inclined surface has a first top edge connected to the first platform surface and a first bottom edge connected to the first optical surface. The second inclined surface has a second top edge connected to the second platform surface and a second bottom edge connected to the second optical surface. The light incident surface is connected to the first platform surface and the second platform surface.

According to the aforementioned object, a backlight module is provided. The backlight module includes the aforementioned light guide plate and a light source. The light source is disposed adjacent to the light incident surface.

According to the aforementioned object, a display device is provided. The display device includes the aforementioned backlight module and a display panel. The display panel is disposed in front of the backlight module.

According to an embodiment of the present invention, the display panel is disposed in front of the first optical surface, and the display panel has a non-display area, and the first strip structures are located in an area of the light guide plate which is corresponding to the non-display area.

It can be known from the aforementioned embodiments of the present invention that, the light guide plate has different first strip structures and second strip structures respectively disposed on first optical surface and the second optical surface. Therefore, the first strip structures can effectively mix light leaked from the first optical surface near the connection portion between the end portion and the light guide portion, and the second strip structures can effectively mix light leaked from the second optical surface near the connection portion between the end portion and the light guide portion, thereby solving the problems of bright band or non-uniform brightness.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
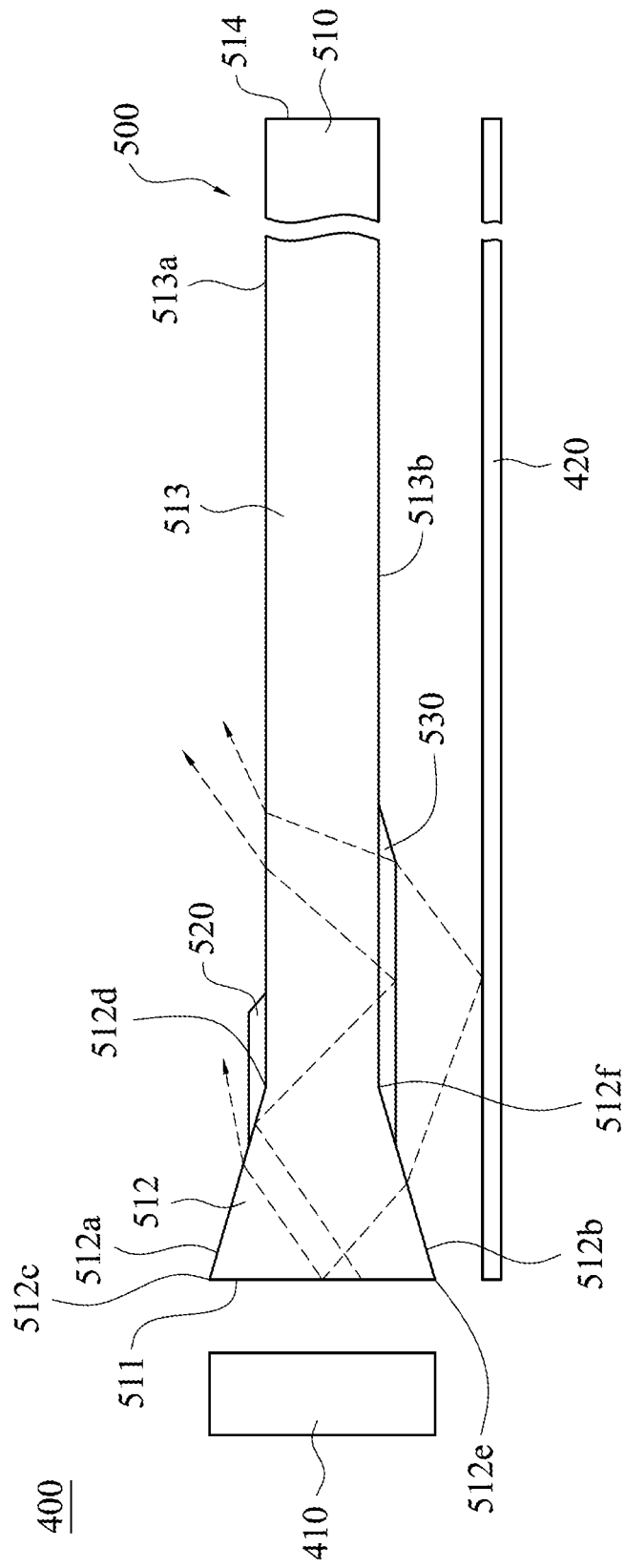
FIG. 1 illustrates a perspective view of a backlight module in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 illustrates a perspective view of a backlight module 400 in accordance with an embodiment of the present invention. The backlight module 400 of the present embodiment mainly includes a light guide plate 500 and a light source 410. The light source 410 is disposed at a side of the light guide plate 500. The light guide plate 500 mainly includes a main body 510, plural first strip structures 520 and plural second strip structures 530. The first strip structures 520 and the second strip structures 530 are disposed on the main body 510. The first strip structures 520 and the second strip structures 530 are used to mix light leaked from a portion near the light-incident side of the light guide plate 500, thereby reducing a non-uniform brightness phenomenon generated adjacent to the light-incident side of the light guide plate 500 and increasing illumination uniformity of the backlight module 400.

Referring to FIG. 1 again, the main body 510 of the light guide plate 500 mainly includes a light incident surface 511, an end portion 512, a light guide portion 513 and a side surface 514. The end portion 512 is a tapered structure and has one end with greater thickness and the other end with smaller thickness. The light incident surface 511 is located at the end of the end portion 512 which has greater thickness. The light guide portion 513 is connected to the end of the end portion 512 which has smaller thickness. The light guide portion 513 is a flat plate with a uniform thickness. In the present embodiment, the end portion 512 has a first inclined surface 512a and a second inclined surface 512b respectively connected to two opposite sides of the light incident surface 511. In addition, the light guide portion 513 has a first optical surface 513a and a second optical surface 513b opposite to each other. The side surface 514 is located at a side of the light guide portion 513 away from the end portion 512, and the side surface 514 is connected to the first optical surface 513a and the second optical surface 513b. As shown in FIG. 1, the first inclined surface 512a has a first top edge 512c and a first bottom edge 512d, the second inclined surface 512b has a second top edge 512e and a second bottom edge 512f. In the present embodiment, the light incident surface 511 is connected to the first top edge 512c and the second top edge 512e, and the first optical surface 513a is connected to the first bottom edge 512d of the first inclined surface 512a, and the second optical surface 513b is connected to second bottom edge 512f of the second inclined surface 512b.

Figure 2:
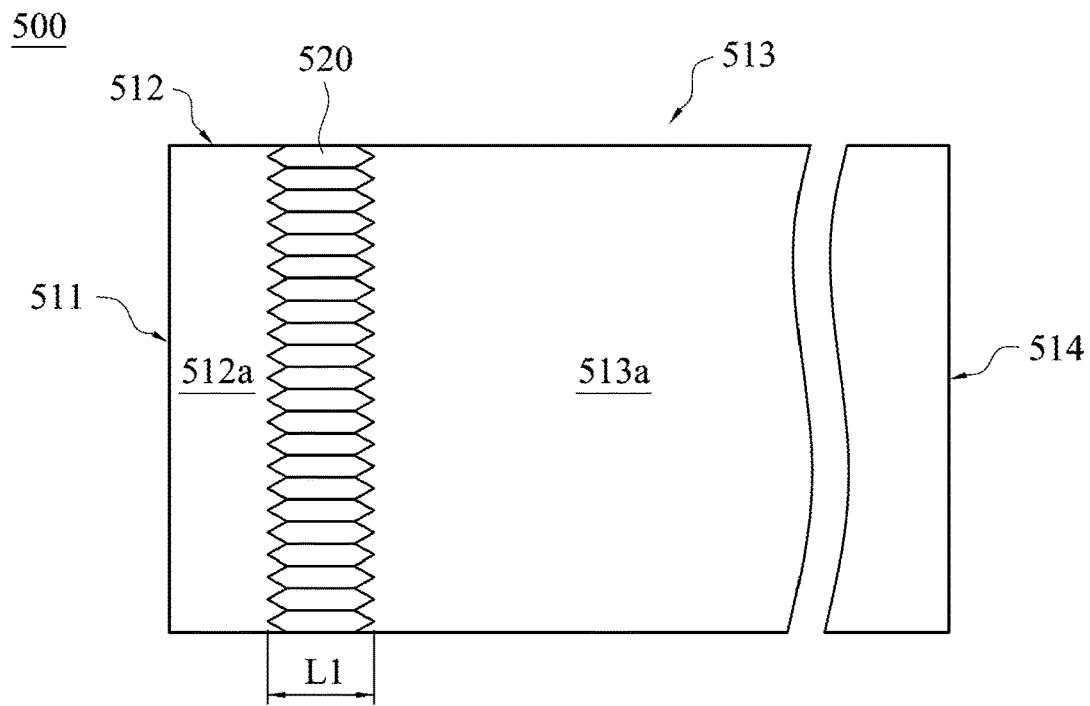
FIG. 2 illustrates a top view of a light guide plate in accordance with a first embodiment of the present invention.
Figure 3:
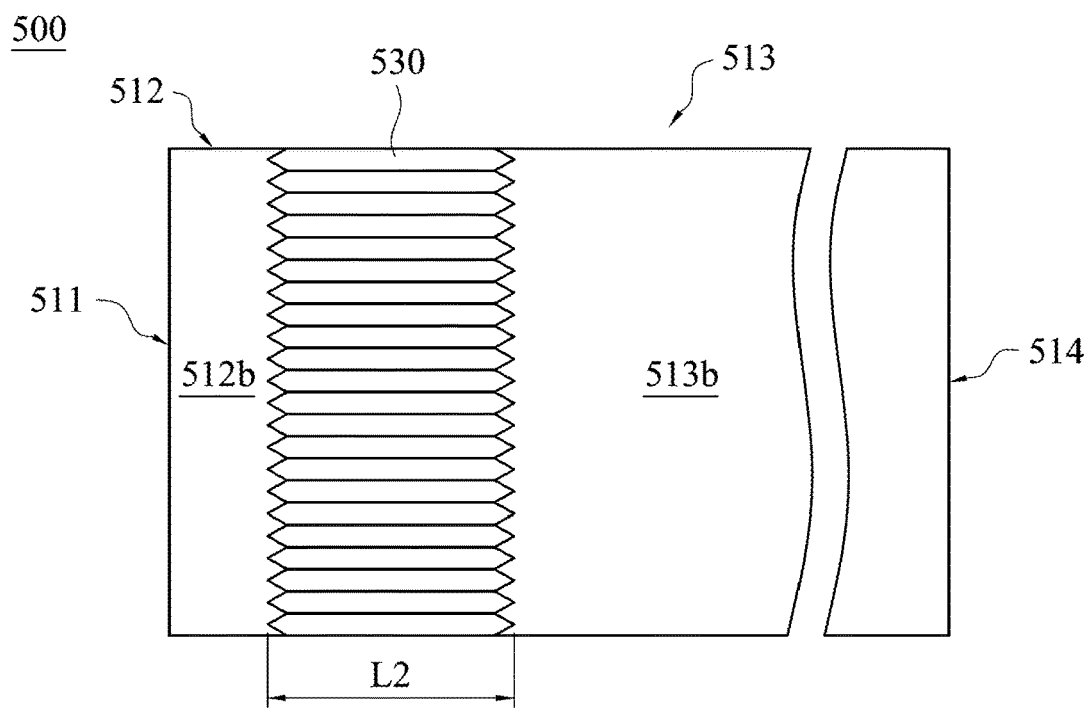
FIG. 3 illustrates a bottom view of the light guide plate in accordance with the first embodiment of the present invention.
Figure 10:
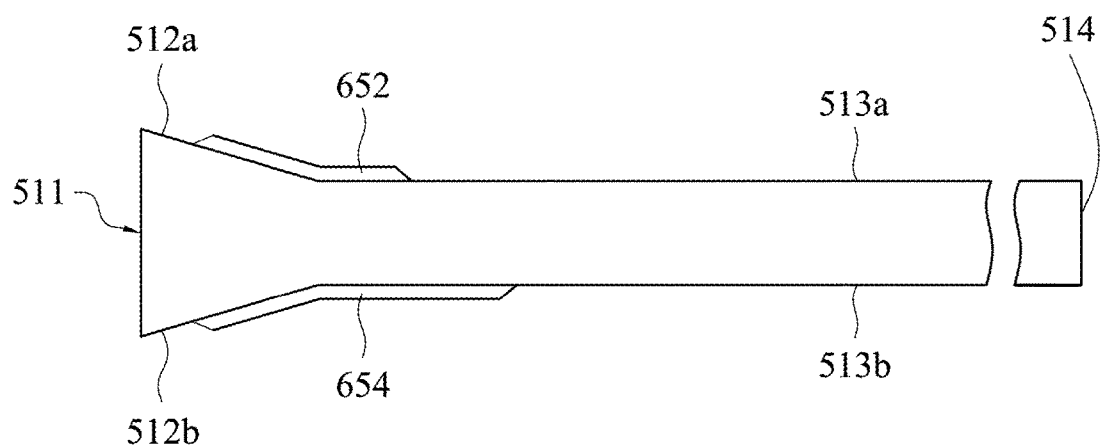
FIG. 10 illustrates a side view of a light guide plate in accordance with a sixth embodiment of the present invention.

Simultaneously referring to FIG. 1, FIG. 2 and FIG. 3, in which FIG. 2 and FIG. 3 illustrate a top view and a bottom view of the light guide plate 500 in accordance with a first embodiment of the present invention. An extending direction of each of the first strip structures 520 and the second strip structures 530 is vertical to the light incident surface 511. In one embodiment, at least one portion of each first strip structure 520 is disposed on the first optical surface 513a, and at least one portion of each second strip structure 530 is disposed on the second optical surface 513b. In the present embodiment, as shown in FIG. 1, one end of each first strip structure 520 is connected to the first bottom edge 512d of the first inclined surface 512a, and the other end of each first strip structure 520 is located between the incidence surface 511 and the side surface 514. One end of each second strip structure 530 is connected to the second bottom edge 512f of the second inclined surface 512b, and the other end of each second strip structure 530 is located between the incidence surface 511 and the side surface 514. In one embodiment, each of the first strip structures 520 and the second strip structures 530 extends along a direction away from the light incident surface 511 of the main body 510. For example, the extending direction of each of the first strip structures 520 and the second strip structures 530 is vertical to the light incident surface 511 of the main body 510 (as shown in the present embodiment), or each of the first strip structures 520 and the second strip structures 530 can be inclined relative to the light incident surface 511 of the main body 510 (as shown in FIG. 10).

In the present embodiment, as shown in FIG. 1, the backlight module 400 further includes a reflecting film 420 disposed at a side of the second optical surface 513b of the light guide plate 500. The reflecting film 420 is used to reflect light which emitted from the second inclined surface 512b or second optical surface 513b back to the light guide plate 500. Without disposing the first strip structures 520 and second strip structures 530 on the main body 510, light provided by the light source 410 is likely leaked from a connection portion between the end portion 512 and the light guide portion 513, thus leading to the problem of bright bands or a non-uniform brightness phenomenon. Therefore, by disposing the first strip structures 520 and second strip structures 530 on the main body 510, light leaked from the connection portion between the end portion 512 and the light guide portion 513 can be mixed, so as to solve the problem of the bright bands or non-uniform brightness on the light guide plate 500.

Referring to FIG. 1, a propagation path of light directly emitted from the first inclined surface 512a or the first optical surface 513a is different from a propagation path of light emitted from the second inclined surface 512b or the second optical surface 513b, reflected back to the main body 510 by the reflecting film 420, and then emitted from the first inclined surface 512a or the first optical surface 513a. Therefore, an inherent type, an arrangement manner or an arrangement position of the first strip structures 520 is different from an inherent type, an arrangement manner or an arrangement position of the second strip structures 530. It is noted that, the "inherent type" used herein means lengths, heights, depths or widths of the first strip structures 520 and the second strip structures 530.

In the present embodiment, a feature of each of the second strip structures 530 is more significant than a feature of each of the first strip structures 520. For example, as shown in FIG. 2 and FIG. 3, a length L2 of each of the second strip structures 530 is greater than a length L1 of each of the first strip structures 520. In the present embodiment, the first optical surface 513a is a light-emitting surface of the backlight module 400. Simultaneously referring to FIG. 13, the display panel 910 is disposed on the backlight module 400. A black edge of the display panel 910 which is not used to display images can be defined as a non-display area, and a central region of the display panel 910 which can display images can be defined as an active area. In the present embodiment, the first strip structures 520, the second strip structures 530 and the end portion 512 of the light guide plate 500 are disposed in the non-display area so as to avoid affecting the light-emitting quality of the active area. On the other hand, in order to comply with the requirements of narrow border backlight module and maximization of display area, the non-display area itself as well as the first strip structures 520 and second strip structures 530 have to be designed to be very small, and therefore second strip structures 530 located on the second optical surface 513b which have more significant feature can effectively improve light-emitting effect of the active area of the light guide plate 500.

Figure 4:
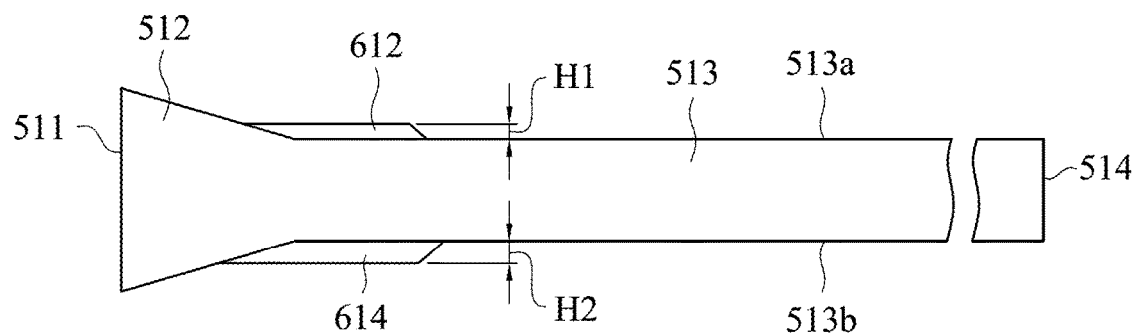
FIG. 4 illustrates a side view of a light guide plate in accordance with a second embodiment of the present invention.

In other embodiments, features of the first strip structures and the second strip structures can be varied. Referring to FIG. 4, FIG. 4 illustrates a side view of a light guide plate 610 in accordance with a second embodiment of the present invention. The structure of the light guide plate 610 in FIG. 4 is similar to that of the light guide plate 500 in FIG. 1, and the main difference therebetween is that first strip structures 612 and second strip structures 614 of the light guide plate 610 have different heights. As shown in FIG. 4, each of the first strip structures 612 and second strip structures 614 is a convex structure. Each of the first strip structures 612 has a height H1, and each of the second strip structures 614 has a height H2. In one embodiment, the height H1 is different from the height H2. In the present embodiment, the height H1 of each first strip structure 612 is smaller than the height H2 of each second strip structure 614. In other words, the feature of each second strip structure 614 is more significant than that of each first strip structure 612. Therefore, when the first strip structures 612 and the second strip structures 614 are designed to be very small, the second strip structures 614 located on the second optical surface 513b which have more significant feature can effectively improve light-emitting effect of an active area of the light guide plate 610. In the present embodiment, a length of the first strip structures 612 is equal to a length of the second strip structures 614. In other embodiments, the length of the first strip structures 612 can be designed to be different from the length of the second strip structures 614 according to different requirements.

Figure 5:
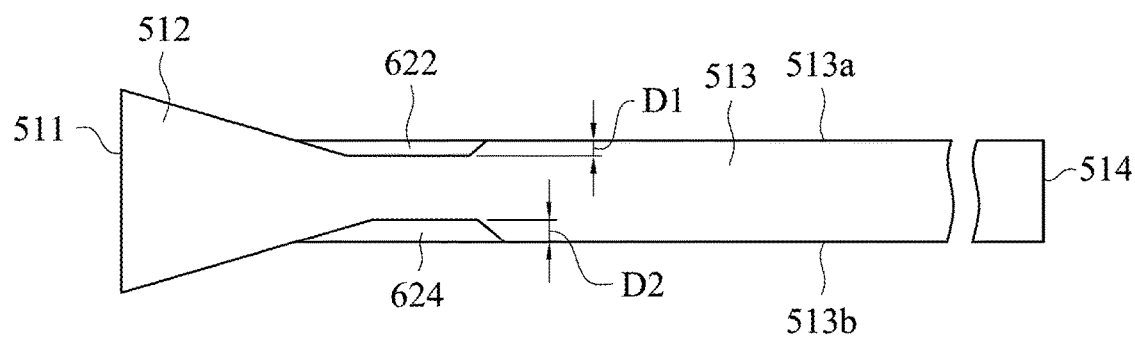
FIG. 5 illustrates a side view of a light guide plate in accordance with a third embodiment of the present invention.

Referring to FIG. 5, FIG. 5 illustrates a side view of a light guide plate 620 in accordance with a third embodiment of the present invention. The structure of the light guide plate 620 in FIG. 5 is similar to that of the light guide plate 610 in FIG. 4, and the main difference therebetween is that each of first strip structures 622 and second strip structures 624 of the light guide plate 620 is a concave structure, and the first strip structures 622 and second strip structures 624 have different depths. As shown in FIG. 5, each of the first strip structures 622 has a depth D1 and each of the second strip structures 624 has a depth D2. In one embodiment, the depth D1 is different from the depth D2. In the present embodiment, the depth D1 of each first strip structure 622 is smaller than the depth D2 of each second strip structure 624. In other words, the feature of each second strip structure 624 is more significant than that of each first strip structure 622. Therefore, when the first strip structures 622 and the second strip structures 624 are designed to be very small, the second strip structures 624 located on the second optical surface 513b which have more significant feature can effectively improve light-emitting effect of an active area of the light guide plate 620. In addition, in the present embodiment, a length of the first strip structures 622 is equal to a length of the second strip structures 624. In other embodiments, the length of the first strip structures 622 can be designed to be different from the length of the second strip structures 624 according to different requirements.

Figure 6:
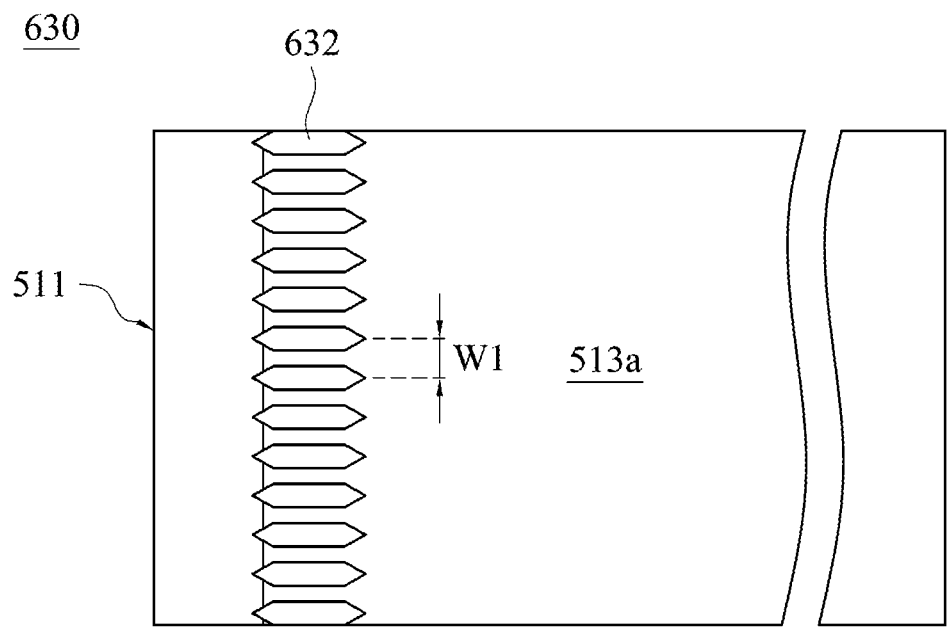
FIG. 6 illustrates a top view of a light guide plate in accordance with a fourth embodiment of the present invention.
Figure 7:
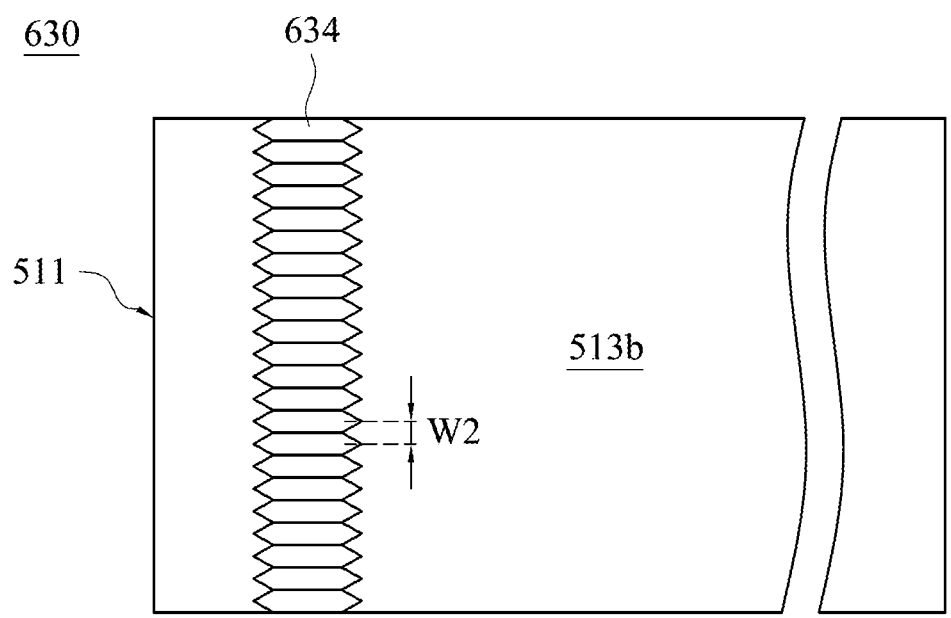
FIG. 7 illustrates a bottom view of the light guide plate in accordance with the fourth embodiment of the present invention.

In some embodiments, the arrangement densities of the first strip structures and the second strip structures can be varied according to different requirements. Simultaneously referring to FIG. 6 and FIG. 7, FIG. 6 and FIG. 7 illustrate a top view and a bottom view of a light guide plate 630 in accordance with a fourth embodiment of the present invention. The structure of the light guide plate 630 in FIG. 6 and FIG. 7 is similar to that of the light guide plate 500 in FIG. 1, and the main difference therebetween is that an arrangement distance between each first strip structure 632 is different from an arrangement distance between each second strip structure 634. As shown in FIG. 6, there is a first distance W1 between any two adjacent first strip structures 632. As shown in FIG. 7, there is a second distance W2 between any two adjacent second strip structures 634. In one embodiment, the first distance W1 is different from the second distance W2. In the present embodiment, the second distance W2 is smaller than the first distance W1. In other words, the second strip structures 634 are arranged more densely than the first strip structures 632. Therefore, the second strip structures 634 located on a back surface of the light guide plate 630 (i.e. the second optical surface 513b which is not used as a light-emitting surface) which have greater arrangement density can effectively improve light-emitting effect of an active area of the light guide plate 630. In addition, a length of the first strip structures 632 is equal to a length of the second strip structures 634. In other embodiments, the length of the first strip structures 632 can be designed to be different from the length of the second strip structures 634 according to different requirements. In addition, a height (or depth) of each first strip structure 632 and a height (or depth) of each second strip structure 634 can be designed to be equal or unequal according to different requirements. It is noted that, in the aforementioned embodiments, the first strip structures 520, 612, 622 and 632 of the light guide plate 500, 610, 620 and 630 which are connected to the first bottom edge 512d of the first inclined surface 512a, and the second strip structures 530, 614, 624 and 634 which are connected to the second bottom edge 512f of the second inclined surface 512b are merely used as an example for explanation, and embodiments of the present invention are not limited thereto. In other embodiments, the first strip structures can be not connected to the first bottom edge 512d, and the second strip structures can be not connected to the second bottom edge 512f. In other words, the first strip structures can be spaced from the first bottom edge at a distance, and the second strip structures can be spaced from the second bottom edge at a distance.

Figure 8:
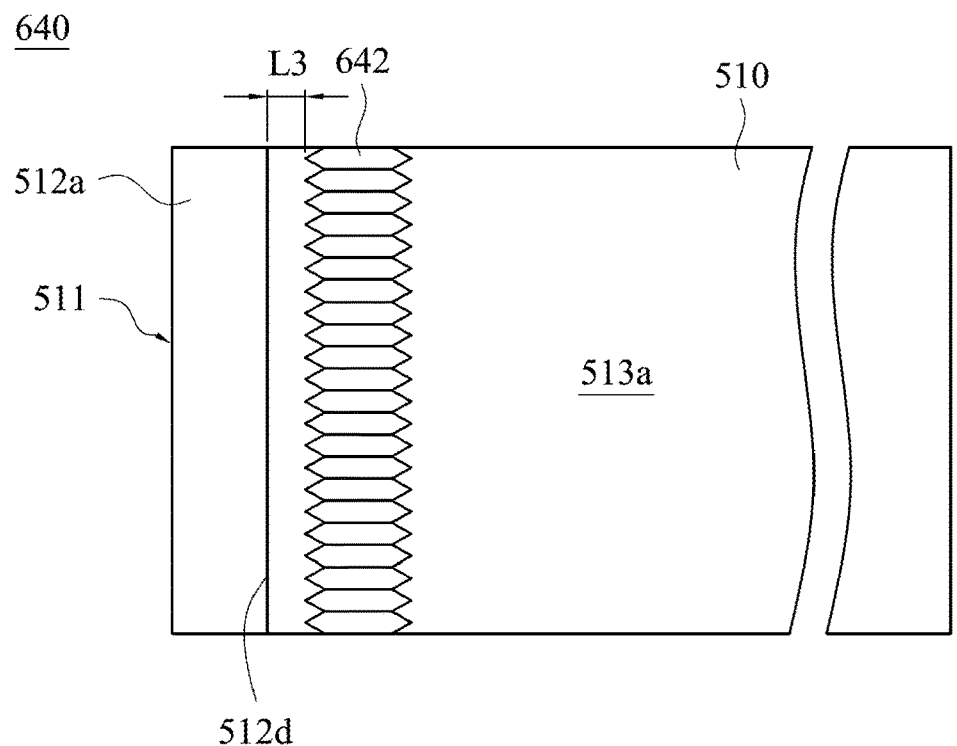
FIG. 8 illustrates a top view of a light guide plate in accordance with a fifth embodiment of the present invention.
Figure 9:
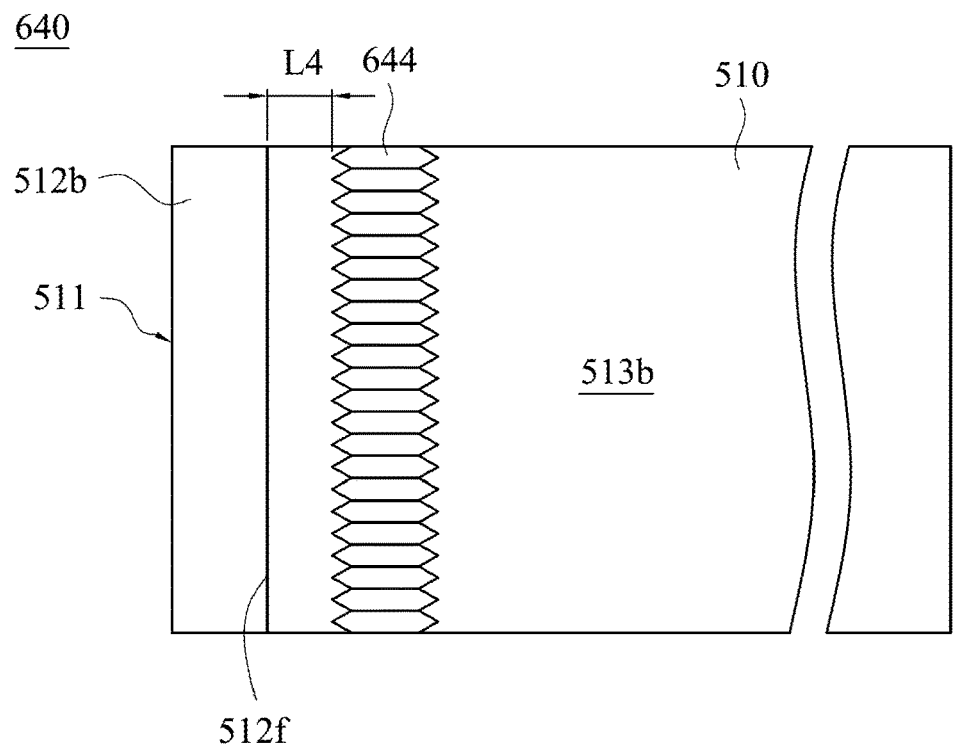
FIG. 9 illustrates a bottom view of the light guide plate in accordance with the fifth embodiment of the present invention.

Referring to FIG. 8 and FIG. 9, FIG. 8 and FIG. 9 illustrate a top view and a bottom view of a light guide plate 640 in accordance with a fifth embodiment of the present invention. The structure of the light guide plate 640 in FIG. 8 and FIG. 9 is similar to that of the light guide plate 500 in FIG. 1, and the main difference therebetween is that a first distance L3 between first strip structures 642 of the light guide plate 640 and the first bottom edge 512d is different from a second distance L4 between second strip structures 644 of the light guide plate 640 and the second bottom edge 512f. In the present embodiment, the second distance L4 is greater than the first distance L3. Therefore, the second strip structures 644 located on a middle region of a back surface (i.e. the second optical surface 513b which is not used as a light-emitting surface) of the light guide plate 640 can effectively improve light-emitting effect of the active area of the light guide plate 640. In one embodiment, an extending direction of a portion of each first strip structure 642 located on the first optical surface 513a and an extending direction of a portion of each second strip structure 644 located on the second optical surface 513b are parallel to a normal line vertical to the light incident surface 511. Moreover, lengths of the first strip structures 642 and the second strip structures 644 are smaller than a length of the main body 510 of the light guide plate 640. In one embodiment, the length of the first strip structures 642 is equal to the length of the second strip structures 644. In other embodiments, the length of the first strip structures 642 can be designed to be different from the length of the second strip structures 644 according to different requirements. In addition, a height (or depth) of each first strip structure 642 and a height (or depth) of each second strip structure 644 can be designed to be equal or unequal according to different requirements.

It is noted that, one end of each first strip structure 520 of FIG. 1 which is connected to the first bottom edge 512d of the first inclined surface 512a, the other end of each first strip structure 520 which is located between the light incident surface 511 and the side surface 514, and one end of each second strip structure 530 is connected to the second bottom edge 512f of the second inclined surface 512b, the other end of each second strip structure 530 which is located between the light incident surface 511 and the side surface 514 are merely used as an example for explanation, and embodiments of the present invention are not limited thereto. In other embodiments, one end of each first strip structure near the light incident surface 511 can be extended onto the first inclined surface 512a, and one end of each second strip structure 530 near the light incident surface 511 can be extended onto the second inclined surface 512b. Referring to FIG. 10, FIG. 10 illustrates a side view of a light guide plate 650 in accordance with a sixth embodiment of the present invention. The structure of the light guide plate 650 in FIG. 10 is similar to that of the light guide plate 500 in FIG. 1, and the main difference therebetween is that first strip structures 652 and second strip structures 654 of the light guide plate 650 have different designs.

As shown in FIG. 10, one end of the first strip structure 652 near the light incident surface 511 is located on the first inclined surface 512a, the other end of the first strip structure 652 away from the light incident surface 511 is located on the first optical surface 513a between the light incident surface 511 and the side surface 514. One end of the second strip structure 654 near the light incident surface 511 is located on the second inclined surface 512b, the other end of the second strip structure 654 away from the light incident surface 511 is located on the second optical surface 513b between the light incident surface 511 and the side surface 514. It is noted that, the designs, the arrangement manners and the effects of the first strip structures 652 and second strip structures 654 are similar to those of the first strip structures 520, 612, 622, 632 and 642 and the second strip structures 530, 614, 624, 634 and 644 shown in FIG. 1-FIG. 9, and therefore will not be described again herein.

Figure 11:
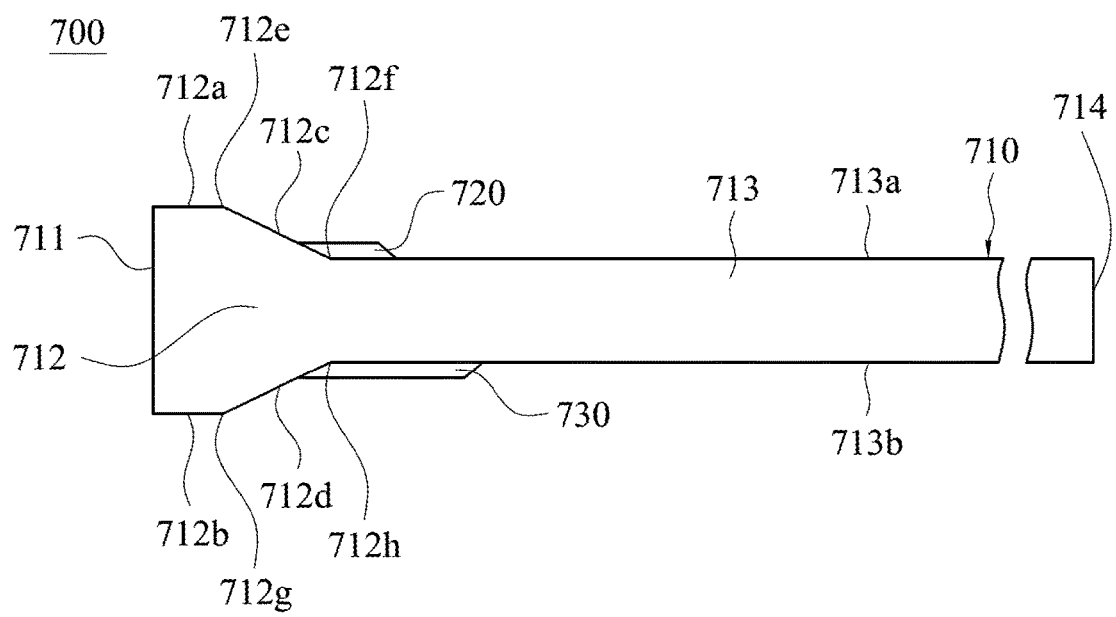
FIG. 11 illustrates a side view of a light guide plate in accordance with a seventh embodiment of the present invention.

In the present invention, the main body of the light guide plate may have different structural designs. Referring to FIG. 11, FIG. 11 illustrates a side view of a light guide plate 700 in accordance with a seventh embodiment of the present invention. The light guide plate 700 of the present embodiment mainly includes a main body 710, plural first strip structures 720 and plural second strip structures 730. The main body 710 mainly includes a light incident surface 711, an end portion 712, a light guide portion 713 and a side surface 714. In the present embodiment, the end portion 712 is a tapered structure and has one end with greater thickness and the other end with smaller thickness. As shown in FIG. 26, the end portion 712 includes a first platform surface 712a, a second platform surface 712b, a first inclined surface 712c and a second inclined surface 712d. The light incident surface 711 is located at a the end of the end portion 712 which has greater thickness, and the light incident surface 711 is connected to the first platform surface 712a and the second platform surface 712b. The light guide portion 713 is connected to the end of the end portion 712 which has smaller thickness, and the light guide portion 713 is a flat plate with a uniform thickness. The light guide portion 713 includes a first optical surface 713a and a second optical surface 713b opposite to each other.

Referring to FIG. 11, the first inclined surface 712c of the end portion 712 has a first top edge 712e and a first bottom edge 712f. The first top edge 712e is connected to the first platform surface 712a, and the first bottom edge 712f is connected to the first optical surface 713a. Similarly, the second inclined surface 712d has a second top edge 712g and a second bottom edge 712h. The second top edge 712g is connected to the second platform surface 712b, and the second bottom edge 712h is connected to the second optical surface 713b. It is noted that, the designs, the arrangement manners and the effects of the first strip structures 720 and second strip structures 730 are similar to those of the first strip structures 520, 612, 622, 632, 642 and 652 and the second strip structures 530, 614, 624, 634, 644 and 654 shown in FIG. 1-FIG. 10, and therefore will not be described again herein.

Figure 12:
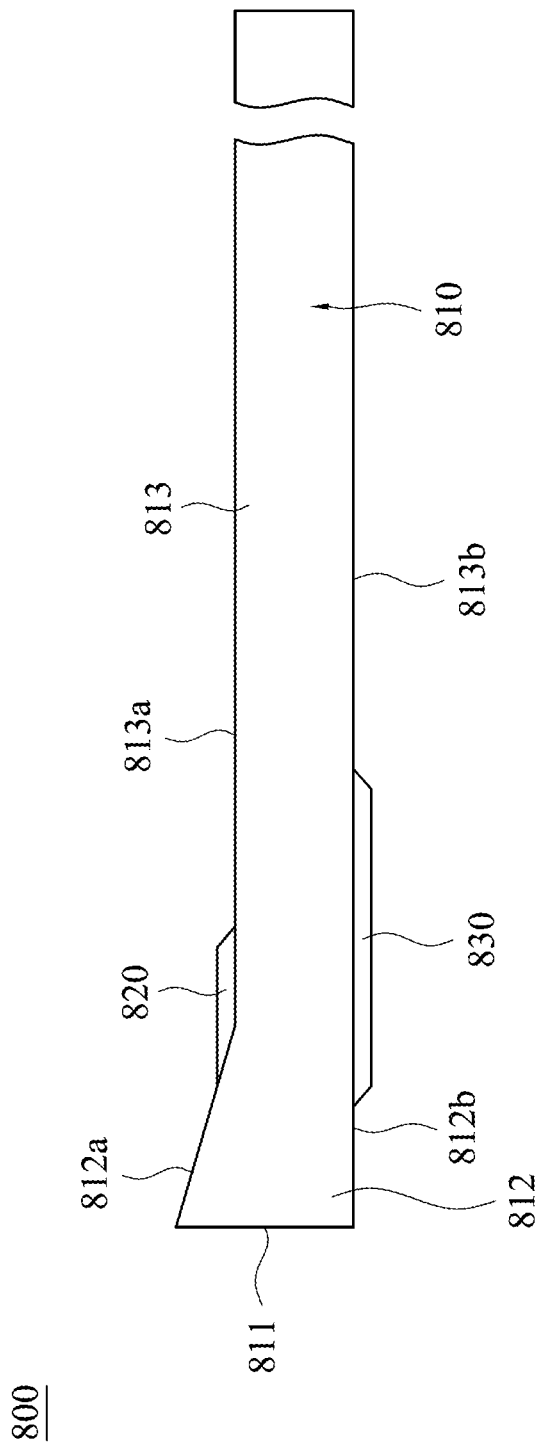
FIG. 12 illustrates a side view of a light guide plate in accordance with an eighth embodiment of the present invention.

In the present invention, the main body of the light guide plate may have different structural designs. Referring to FIG. 12, FIG. 12 illustrates a side view of a light guide plate 800 in accordance with an eighth embodiment of the present invention. The light guide plate 800 of the present embodiment mainly includes a main body 810, plural first strip structures 820 and plural second strip structures 830. The main body 810 mainly includes a light incident surface 811, an end portion 812 and a light guide portion 813. In the present embodiment, the end portion 812 is a tapered structure and has one end with greater thickness and the other end with smaller thickness. Moreover, the end portion 812 has an inclined surface 812a at one side and a flat surface 812b at the other side. As shown in FIG. 12, the light incident surface 811 is located on the end of the end portion 812 which has greater thickness, and the light guide portion 813 is connected to the end of the end portion 812 which has smaller thickness. The light guide portion 813 is a flat plate with a uniform thickness. In the present embodiment, the light guide portion 813 has a first optical surface 813a and a second optical surface 813b opposite to each other.

Referring to FIG. 12, in the present embodiment, the first strip structures 820 and the second strip structures 830 are respectively disposed on the first optical surface 813a and the second optical surface 813b. It is noted that, the designs, the arrangement manners and the effects of the first strip structures 820 and second strip structures 830 are similar to those of the first strip structures 520, 612, 622, 632, 642, 652 and 720 and the second strip structures 530, 614, 624, 634, 644, 654 and 730 shown in FIG. 1-FIG. 11, and therefore will not be described again herein.

Figure 13:
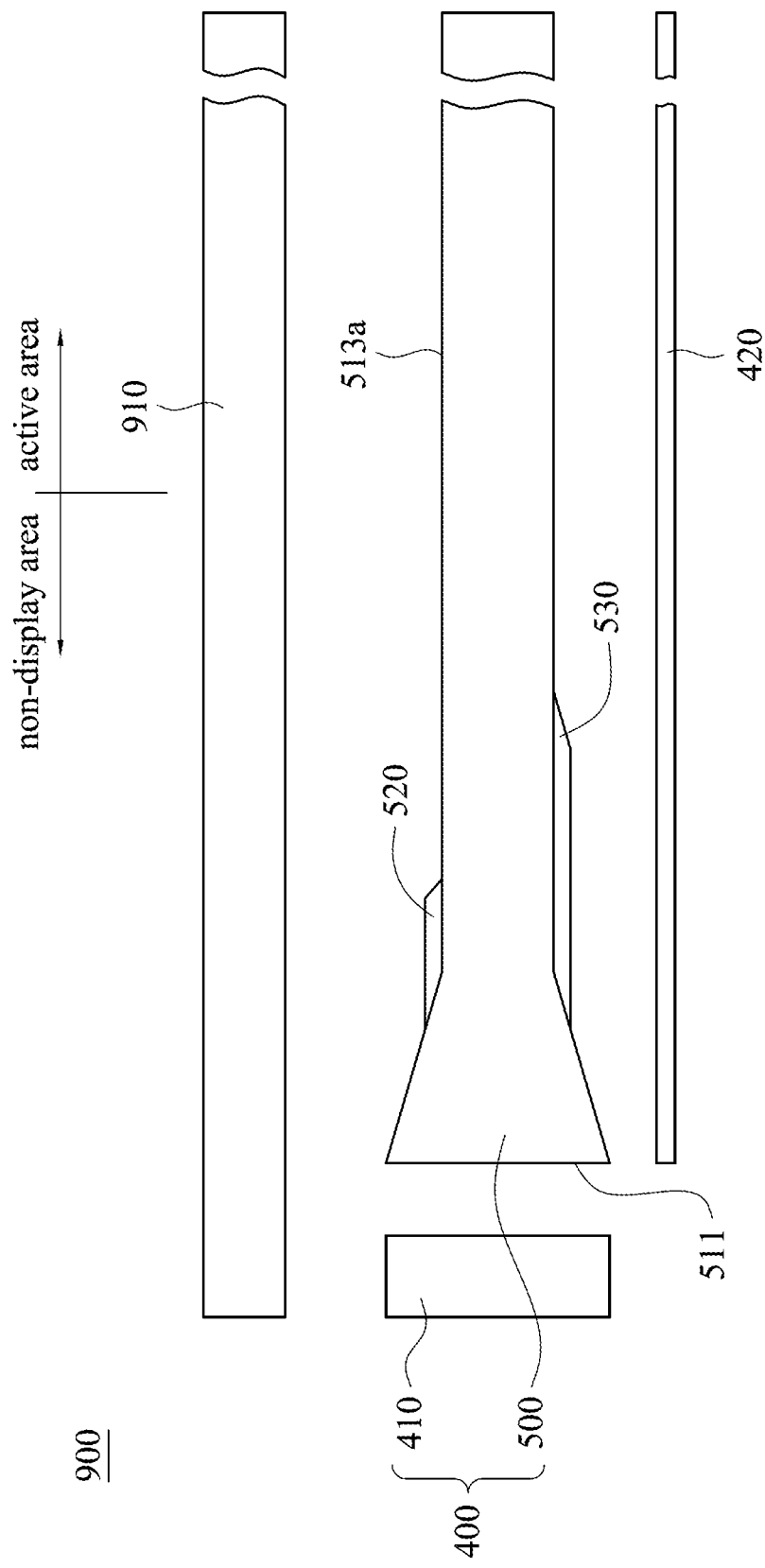
FIG. 13 illustrates a perspective view of a display device in accordance with an embodiment of the present invention.

Referring to FIG. 13, FIG. 13 illustrates a perspective view of a display device 900 in accordance with an embodiment of the present invention. The display device 900 of the present embodiment includes a backlight module 400 shown in FIG. 1 and a display panel 910. As shown in FIG. 13, the display panel 910 is disposed in front of the first optical surface 513a of the light guide plate 500 in the backlight module 400. The first strip structures 520 of the light guide plate 500 is disposed corresponding to the non-display area of the display panel, and the first strip structures 520 can be used to cooperate with the second strip structures 530 so as to achieve the objectives of adjusting light as described above and will not be described therein. It is noted that, the backlight module 400 having the light guide plate 500 shown in FIG. 1 is merely used as an example applied to the display device 800 for explanation, and embodiments of the present invention are not limited thereto. In other embodiments, other backlight modules, such as the backlight modules having the light guide plate 500, 610, 620, 630, 640, 650 and 700 also can be applied to a display device, so as to achieve the same effect.

It can be known from the aforementioned embodiments of the present invention that, the light guide plate has different first strip structures and second strip structures respectively disposed on first optical surface and the second optical surface. Therefore, the first strip structures can effectively mix light leaked from the first optical surface near the connection portion between the end portion and the light guide portion, and the second strip structures can effectively mix light leaked from the second optical surface near the connection portion between the end portion and the light guide portion, thereby solving the problems of bright band or non-uniform brightness.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
   a main body, comprising:
      a light incident surface;
      an end portion having a first inclined surface and a second inclined surface, wherein a thickness of one end near the light incident surface of the end portion is greater than the other end of the end portion; and
      a light guide portion connected to the end portion, wherein the light guide portion has a first optical surface and a second optical surface opposite to the first optical surface, and the first optical surface is connected to the first inclined surface, and the second optical surface is connected to the second inclined surface;
   a plurality of first strip structures, wherein each of the first strip structures is disposed on the first optical surface, and each of the first strip structures is connected to a first bottom edge of the first inclined surface, and an extending direction of each first strip structure is vertical to the light incident surface; and a plurality of second strip structures, wherein each of the second strip structures is disposed on the second optical surface, and each of the second strip structures is connected to a second bottom edge of the second inclined surface, and an extending direction of each second strip structure is vertical to the light incident surface;

wherein an inherent type, an arrangement manner or an arrangement position of the first strip structures is different from an inherent type, an arrangement manner or an arrangement position of the second strip structures.

2. The light guide plate according to claim 1, wherein each of the second strip structures has a more significant feature than each of the first strip structures.

3. The light guide plate according to claim 1, wherein an arrangement density of the second strip structures is greater than an arrangement density of the first strip structures.

4. The light guide plate according to claim 1, wherein one end of each of the first strip structures and the second strip structures away from the light incident surface is located between the light incident surface of the main body and a side surface opposite to the light incident surface.

5. The light guide plate according to claim 1, wherein
the first inclined surface further has a first top edge, wherein the first bottom is connected to the first optical surface; and
the second inclined surface further has a second top edge, wherein the second bottom edge is connected to the second optical surface;
wherein the light incident surface is connected to the first top edge and the second top edge.

6. The light guide plate according to claim 1, wherein the end portion comprises:
a first platform surface;
a second platform surface;
wherein the first inclined surface further has a first top edge connected to the first platform surface; and
wherein the second inclined surface further has second top edge connected to the second platform surface;
wherein the light incident surface is connected to the first platform surface and the second platform surface.

7. A backlight module, comprising:
a light guide plate as claimed in claim 1; and
a light source disposed adjacent to the light incident surface.

8. A display device, comprising:
a backlight module as claimed in claim 7, and
a display panel disposed in front of the backlight module.

9. The display device of claim 8, wherein the display panel is disposed in front of the first optical surface, and the display panel has a non-display area, and the first strip structures are located in an area of the light guide plate which is corresponding to the non-display area.

10. A light guide plate, comprising:
a main body, comprising:
a light incident surface;
an end portion having a first inclined surface and a second inclined surface, wherein a thickness of one end near the light incident surface of the end portion is greater than the other end of the end portion; and
a light guide portion connected to the end portion, wherein the light guide portion has a first optical surface and a second optical surface opposite to the first optical surface, and the first optical surface is connected to the first inclined surface, and the second optical surface is connected to the second inclined surface;

a plurality of first strip structures, wherein each of the first strip structures is disposed on the first optical surface, and there is a first distance between each first strip structure and a first bottom edge of the first inclined surface; and a plurality of second strip structures, wherein each of the second strip structures is disposed on the second optical surface, there is a second distance between each second strip structure and a second bottom edge of the second inclined surface;

wherein an inherent type, an arrangement manner or an arrangement position of the first strip structures is different from an inherent type, an arrangement manner or an arrangement position of the second strip structures;

wherein the first distance is different from the second distance.

11. The light guide plate according to claim 10, wherein an extending direction of each first strip structure and an extending direction of each second strip structure are vertical to the light incident surface.

12. The light guide plate according to claim 10, wherein each of the second strip structures has a more significant feature than each of the first strip structures.

13. The light guide plate according to claim 10, wherein an arrangement density of the second strip structures is greater than an arrangement density of the first strip structures.

14. The light guide plate according to claim 10, wherein one end of each of the first strip structures and the second strip structures away from the light incident surface is located between the light incident surface of the main body and a side surface opposite to the light incident surface.

15. The light guide plate according to claim 10, wherein
the first inclined surface further has a first top edge, wherein the first bottom is connected to the first optical surface; and
the second inclined surface further has a second top edge, wherein the second bottom edge is connected to the second optical surface;
wherein the light incident surface is connected to the first top edge and the second top edge.

16. The light guide plate according to claim 10, wherein the end portion comprises:
a first platform surface;
a second platform surface;
wherein the first inclined surface further has a first top edge connected to the first platform surface; and
wherein the second inclined surface further has a second top edge connected to the second platform surface;
wherein the light incident surface is connected to the first platform surface and the second platform surface.

17. A backlight module, comprising:
a light guide plate as claimed in claim 10; and
a light source disposed adjacent to the light incident surface.

18. A display device, comprising:
a backlight module as claimed in claim 17, and
a display panel disposed in front of the backlight module.

19. The display device of claim 18, wherein the display panel is disposed in front of the first optical surface, and the display panel has a non-display area, and the first strip structures are located in an area of the light guide plate which is corresponding to the non-display area.

20. A light guide plate, comprising:
a main body, comprising:
a light incident surface;
an end portion having a first inclined surface and a second inclined surface, wherein a thickness of one end near the light incident surface of the end portion is greater than the other end of the end portion; and
a light guide portion connected to the end portion, wherein the light guide portion has a first optical surface and a second optical surface opposite to the first optical surface, and the first optical surface is connected to the first inclined surface, and the second optical surface is connected to the second inclined surface;
a plurality of first strip structures, wherein one portion of each first strip structure is located on the first inclined surface, and the other portion of each first strip structure is located on the first optical surface; and
a plurality of second strip structures, wherein one portion of each second strip structure is located on the second inclined surface, and the other portion of each second strip structure is located on the second optical surface;
wherein each of the first strip structures and second strip structures is a continuous type of structure;
wherein an inherent type, an arrangement manner or an arrangement position of the first strip structures is different from an inherent type, an arrangement manner or an arrangement position of the second strip structures.

21. The light guide plate according to claim 20, wherein an extending direction of each first strip structure and an extending direction of each second strip structure are vertical to the light incident surface.

22. The light guide plate according to claim 20, wherein each of the second strip structures has a more significant feature than each of the first strip structures.

23. The light guide plate according to claim 20, wherein an arrangement density of the second strip structures is greater than an arrangement density of the first strip structures.

24. The light guide plate according to claim 20, wherein one end of each of the first strip structures and the second strip structures away from the light incident surface is located between the light incident surface of the main body and a side surface opposite to the light incident surface.

25. The light guide plate according to claim 20, wherein
the first inclined surface further has a first top edge, wherein the first bottom is connected to the first optical surface; and
the second inclined surface further has a second top edge, wherein the second bottom edge is connected to the second optical surface;
wherein the light incident surface is connected to the first top edge and the second top edge.

26. The light guide plate according to claim 20, wherein the end portion comprises:
a first platform surface;
a second platform surface;
wherein the first inclined surface further has a first top edge connected to the first platform surface; and
wherein the second inclined surface further has a second top edge connected to the second platform surface;
wherein the light incident surface is connected to the first platform surface and the second platform surface.

27. A backlight module, comprising:
a light guide plate as claimed in claim 20; and
a light source disposed adjacent to the light incident surface.

28. A display device, comprising:
a backlight module as claimed in claim 27, and
a display panel disposed in front of the backlight module.

29. The display device of claim 28, wherein the display panel is disposed in front of the first optical surface, and the display panel has a non-display area, and the first strip structures are located in an area of the light guide plate which is corresponding to the non-display area.

* * * * *